United States Patent [19]

Yamamoto et al.

[11] Patent Number: 5,287,280
[45] Date of Patent: Feb. 15, 1994

[54] METHOD AND APPARATUS FOR CONTROLLING SHOE SLIP OF CRAWLER VEHICLE

[75] Inventors: Shigeru Yamamoto, Osaka; Hideki Yamada, Kyoto; Shinji Takasugi, Tokyo, all of Japan

[73] Assignee: Kabushiki Kaisha Komatsu Seisakusho, Tokyo, Japan

[21] Appl. No.: 877,362
[22] PCT Filed: Sep. 14, 1988
[86] PCT No.: PCT/JP88/00932
§ 371 Date: May 11, 1990
§ 102(e) Date: May 11, 1990
[87] PCT Pub. No.: WO89/02520
PCT Pub. Date: Mar. 23, 1989

Related U.S. Application Data

[63] Continuation of Ser. No. 764,976, Sep. 23, 1991, abandoned, which is a continuation of Ser. No. 465,236, May 11, 1990, abandoned.

[30] Foreign Application Priority Data

Sep. 14, 1987 [JP] Japan ................. 62-230826
Sep. 17, 1987 [JP] Japan ................. 62-23116
Sep. 17, 1987 [JP] Japan ................. 62-231115

[51] Int. Cl.$^5$ ............................................. B60T 8/58
[52] U.S. Cl. .................... 364/426.03; 364/424.07; 180/197
[58] Field of Search ........... 364/426.01, 426.02, 364/426.03, 424.07, 566; 180/197; 303/95, 96, 97, 98, 99

[56] References Cited

U.S. PATENT DOCUMENTS

| | | | |
|---|---|---|---|
| 3,603,157 | 9/1971 | Krugler, Jr. ....................... | 73/503 |
| 4,094,109 | 6/1978 | Holdren et al. ................. | 364/566 X |
| 4,116,294 | 9/1978 | Johnston ......................... | 180/44 F |
| 4,282,933 | 8/1981 | Suganami et al. ............. | 364/505 X |
| 4,399,886 | 8/1983 | Pollman ......................... | 180/197 |
| 4,653,816 | 3/1987 | Lin ................................. | 303/106 |
| 4,670,852 | 6/1987 | Masaki et al. ................. | 364/565 |
| 4,722,411 | 2/1988 | Ohashi et al. ................. | 180/197 |
| 4,778,025 | 10/1988 | Sakaguch et al. ............. | 180/197 |
| 4,788,644 | 11/1988 | Inagaki ......................... | 364/426.03 |
| 4,866,618 | 9/1989 | Tamura et al. ............... | 364/431.03 |
| 4,866,625 | 9/1989 | Kawamoto et al. .......... | 364/426.02 |
| 5,003,481 | 3/1991 | Matsuda ...................... | 364/426.02 |

FOREIGN PATENT DOCUMENTS

| | | |
|---|---|---|
| 56-131721 | 1/1981 | Japan . |
| 56-135638 | 10/1981 | Japan . |
| 58-123932 | 7/1983 | Japan . |
| 58-49661 | 11/1983 | Japan . |
| 60-245859 | 12/1985 | Japan . |

Primary Examiner—Thomas G. Black
Assistant Examiner—Collin W. Park
Attorney, Agent, or Firm—Armstrong, Westerman, Hattori, McLeland & Naughton

[57] ABSTRACT

This invention relates to a method and apparatus for controlling shoe slip of a crawler vehicle directed to automatically prevent an endless track from slipping beyond the state where maximum pulling force is attained thereby liberating an operator from troublesome operations requiring a high level of skill. The shoe slip control method is accomplished by switching the operation mode to a predetermined engine output mode when a shoe slip ratio exceeds a predetermined value during the operation of the vehicle. The apparatus includes an acceleration detecting device (27) for detecting the acceleration in the travelling direction of the vehicle, a travelling speed computing circuit (31) for the endless track, an actual vehicle speed computing circuit (32) for calculating the actual vehicle speed on the basis of the acceleration thus detected, a shoe slip ratio computing circuit (33) for calculating the shoe slip ratio from the actual vehicle speed and the track travelling speed, and an engine output control circuit for switching the engine output mode on the basis of the shoe slip ratio thus calculated.

7 Claims, 10 Drawing Sheets

FIG.9A
ACCELERATION DUE TO SLIPPAGE
0.1-0.3G
0.5-0.1 SECONDS

FIG.9B
SUDDEN SLIPPAGE OCCURS WHEN LOAD EXCEEDS PRESET VALUE

FIG.9C
TILT.DRIFT.ERROR OUTPUT
αs MAX.=0.6G
(IN CASE OF TILTING RATE OF 35 DEGREES PER SECOND)

FIG.9D
COMPENSATION
0.05 SECONDS

METHOD AND APPARATUS FOR CONTROLLING SHOE SLIP OF CRAWLER VEHICLE

This application is a continuation of application Ser. No. 07/764,976, filed Sep. 23, 1991, now abandoned, which is a continuation of application Ser. No. 465,236, filed May 11, 1990, now abandoned.

FIELD OF THE INVENTION

The present invention relates to a method and apparatus for controlling shoe slip of a crawler vehicle such as bulldozers and shovel loaders, and more particularly to a method and apparatus for controlling the shoe slip of a crawler vehicle in which, in order to improve operational efficiency of the vehicle by effectively using a tractive force of the vehicle, an optimum engine power output mode of the vehicle is selected in operation with reference to a preset value of the shoe slip rate of the vehicle such that a maximum tractive force of the vehicle is produced.

DESCRIPTION OF THE PRIOR ART

In general, during traveling of crawler vehicles such as bulldozers and shovel loaders, the power outputs of the engines of the crawler vehicles are transmitted to track-driving sprocket wheels of the vehicles through power trains containing torque converters, transmissions, differential gears and final reduction gears. The crawlers or endless tracks running round the sprocket wheels of the crawler vehicles are driven by the power outputs of the engines to enable the crawler vehicles to travel. Consequently, drawbar-pulls or tractive forces produced in the crawlers or endless tracks of the vehicles can be calculated or computed from both of the power outputs of the engines and total reduction rates of the power trains of the crawler vehicles.

On the other hand, in the crawler vehicles, the power outputs of the engines thereof are manually controlled through main control levers of the vehicles so as to be set on predetermined values. The power outputs of the engines thus controlled through the main control levers are reduced by depressing deceleration pedals of the crawler vehicles. When the deceleration pedals having been depressed are released from external depressing forces exerted by an operator of the vehicle, the predetermined values of the power outputs of the engines are recovered.

Drawbar-pulls or tractive forces of the crawler vehicles in traveling depend on the slip rates of the shoes on the crawlers or tracks of the vehicles on the ground, the slip rates of the shoes being hereinafter simply referred to as the shoe slip rates. Until the shoe slip rates of the vehicles reach predetermined critical values or preset values, the drawbar-pulls or tractive forces of the vehicles increase as the shoe slip rates increase. However, when the shoe slip rates exceed the predetermined critical values, the crawlers or tracks of the vehicles merely slip on the ground thereby causing many disadvantages such as large energy loss and excessive wear of the crawlers or tracks; and making the crawlers or the tracks incapable of effectively utilizing the power outputs of the engines for producing sufficient drawbar-pulls or tractive forces.

For example, in a bulldozing operation conducted by a blade unit of a bulldozer or in a ripping operation conducted by a ripper unit of the bulldozer, when the bulldozer is subjected to an excessive load that causes a shoe slip, such a shoe slip is recognized by an operator of the bulldozer. After that, the operator depresses a deceleration pedal of the bulldozer to lower the power output of the engine of the bulldozer, and simultaneously he operates the bulldozer's working equipment such as the blade unit and the ripper unit so as to reduce the load, through which the drawbar-pull or tractive force of the bulldozer is lowered. The above operator's cumbersome manual operation for resolving disadvantages resulting from the shoe slip requires a high degree of skill.

Namely, in compensating for the shoe slip conducted through the operator's manual operation, the operator must depress the deceleration pedal after he recognizes the shoe slip, and simultaneously he must operate the working equipment of the bulldozer. Consequently, the operator's manual operation is very cumbersome, and requires extreme caution. In addition, in actual operation of the bulldozer, the power output of the engine is manually lowered by the operator only after he recognizes the shoe slip has occurred. Consequently, it is impossible for the operator to prevent the shoe slip from occurring. In other words, in the actual operation of the bulldozer, the shoe slip continues for a certain period of time without exception. In addition, some operators intentionally slip on the ground. Therefore, under such circumstances, it is very difficult to prevent the shoe slip from occurring during the operation of the bulldozer. Furthermore, hitherto, after the shoe slip that occurred during operation of the bulldozer is removed, the deceleration pedal of the bulldozer must be released from an external depressing force exerted by the operator, so as to return to its initial pedal position in which the deceleration pedal permits the working power output of the engine to be recovered.

Japanese Patent Laid-Open No. 60-245859 discloses a technique for obtaining engine power outputs corresponding to the working conditions of vehicles without depending on the operator's recognition and decision. In this technique, a governor control lever of a vehicle is automatically switched over in correspondence with loads to which a drive system of the vehicle is subjected, so that the cumbersome manual operation by the operator is resolved and the vehicle is improved in its fuel consumption.

In the conventional technique disclosed in the above Japanese Patent Laid-Open No. 60-245859, rotational speeds of the drive system of the vehicle are detected, analyzed and calculated to offer results on the basis of which the governor control lever of the vehicle is switched over stepwise. Consequently, in the above conventional technique, it is impossible to continuously change the power output of the engine of the vehicle. In addition, the technique lacks measures to return the operation of the engine back to its working power output condition.

On the other hand, as another conventional technique, Japanese Patent Publication No. 58-49661 discloses an apparatus for controlling the shoe slip of the vehicle. This conventional technique employs: a Doppler-type speed detecting means for detecting a traveling speed of a vehicle; a shoe slip rate detecting means for detecting a shoe slip rate of the vehicle on the basis of both of the traveling speed of the vehicle detected by the Doppler-type speed detecting means and a rotational speed of a sprocket wheel detected in a sprocket-wheel drive mechanism of the vehicle; and a means for issuing a signal at a time when the shoe slip rate having been detected exceeds a predetermined value, the signal being used to reduce a load of the working equipment of the vehicle.

In the above Doppler-type speed detecting means, a microwave signal is issued to the ground and reflected therefrom to produce a reflected wave which is received to determine an actual velocity or traveling speed of the vehicle relative to the ground. Consequently, in cases where the Doppler-type speed detecting means is used on the water or rough ground for conducting a speed detecting operation, such a detecting operation is poor in accuracy and too slow in response speed. In addition to the above, the Doppler-type speed detecting means often malfunctions in cases where there are a plurality of sensors in the vicinity of the speed detecting mans. Furthermore, the Doppler-type speed detecting means suffers from its relatively high cost because the speed detecting means requires expensive auxiliary units such as space filters, laser oscillators and the like.

SUMMARY OF THE INVENTION

Under such circumstances, the present invention was made.

It is a first object of the present invention to provide a method for controlling the shoe slip of a crawler vehicle by automatically prevents a rate of the shoe slip or shoe slip rate of the vehicle from exceeding a preset value or limit thereby enabling the vehicle to effectively utilize its tractive force for performing necessary works and also enabling an operator of the vehicle to be free from cumbersome and skilled manual operations of the vehicle.

It is a second object of the present invention to provide, at a relatively low cost, an apparatus for carrying out the above method of the present invention without fail.

According to a first embodiment of the present invention, the above first object of the present invention is accomplished by providing:

A method for controlling the shoe slip of a crawler vehicle comprising endless tracks, a torque converter and an engine, characterized in that:

when a shoe slip ratio of the crawler vehicle exceeds a preset value in operation, a predetermined engine power output mode of the crawler vehicle is selected.

According to a second embodiment of the present invention, there is provided:

The method for controlling the shoe slip of the crawler vehicle as set forth in the first embodiment of the present invention, wherein:

the shoe slip ratio of the crawler vehicle is computed on the basis of: a traveling speed of the endless tracks, the track traveling speed having been computed from both of a rotating speed of a power output side of the torque converter such as a torque converter power output side rotating speed and a gear shifting signal; and an actual vehicle speed having been detected by a vehicle speed detecting mans.

According to a third embodiment of the present invention, there is provided:

The method for controlling the shoe slip of the crawler vehicle as set forth in the first embodiment of the present invention, wherein:

the predetermined engine power output mode of the crawler vehicle is selected on the basis of a theoretical tractive force computed from: an engine speed of the engine; the torque converter power output side rotating speed; and the gear shifting signal.

According to a fourth embodiment of the present invention, there is provided:

The method for controlling the shoe slip of the crawler vehicle as set forth in the second embodiment of the present invention, wherein:

the vehicle speed detecting means detects the rate of acceleration of the crawler vehicle in its traveling direction.

According to a fifth embodiment of the present invention, there is provided:

A method for controlling the shoe slip of a crawler vehicle having an engine, comprising the steps of:

detecting an actual vehicle speed of the crawler vehicle at a time when the shoe slip of the crawler vehicle exceeds a shoe slip preset limit, by the use of a vehicle speed detecting means mounted on the crawler vehicle;

computing a shoe slip rate of the crawler vehicle on the basis of the actual vehicle speed having been detected and a theoretical vehicle speed;

cutting off the engine power output of the engine of the crawler vehicle by shifting the operation mode of the engine from a predetermined specific engine power output mode to a cut-off mode at a time when the shoe slip rate of the crawler vehicle having been computed exceeds a preset first shoe slip ratio value or when another trigger signal is issued; and returning the operation mode of the engine back to the predetermined specific engine power output mode at a time when the shoe slip rate of the crawler vehicle drops to a predetermined second shoe slip ratio value after the engine power output is cut off.

According to a sixth embodiment of the present invention, there is provided:

An apparatus for controlling the shoe slip of a crawler vehicle having an engine and endless tracks, comprising:

an acceleration detecting means for detecting acceleration of the crawler vehicle in its traveling direction;

a track traveling speed computing circuit for computing a traveling speed of the endless tracks of the crawler vehicle;

an actual vehicle speed computing circuit for computing an actual vehicle speed of the crawler vehicle on the basis of the acceleration having been detected;

a shoe slip ratio computing circuit for computing a shoe slip ratio of the crawler vehicle on the basis of the actual vehicle speed and the track traveling speed of the crawler vehicle; and an engine power output control circuit for selecting the best one of the engine power output modes of the engine of the crawler vehicle according to the shoe slip rate having been computed.

The above objects, additional objects, additional embodiments and advantages of the present invention will be clarified to those skilled in the art hereinbelow with reference to the following description and accompanying drawings illustrating preferred embodiments of the present invention according to principles of the present invention.

BRIEF DESCRIPTION OF THE DRAWINGS

Each of FIGS. 4 and 5 is a diagram of the variation of the tractive force of the crawler vehicle shown in FIG. 1, as a function of the track traveling speed of the vehicle;

FIGS. 10-1 and 10-2 show a flowchart illustrating the operation of the shoe slip rate computing circuit of the apparatus of the present invention employed in the crawler vehicle shown in FIG. 1.

DESCRIPTION OF THE PREFERRED EMBODIMENTS

Now, the present invention will be described in detail with reference to the accompanying drawings.

Figure 1:
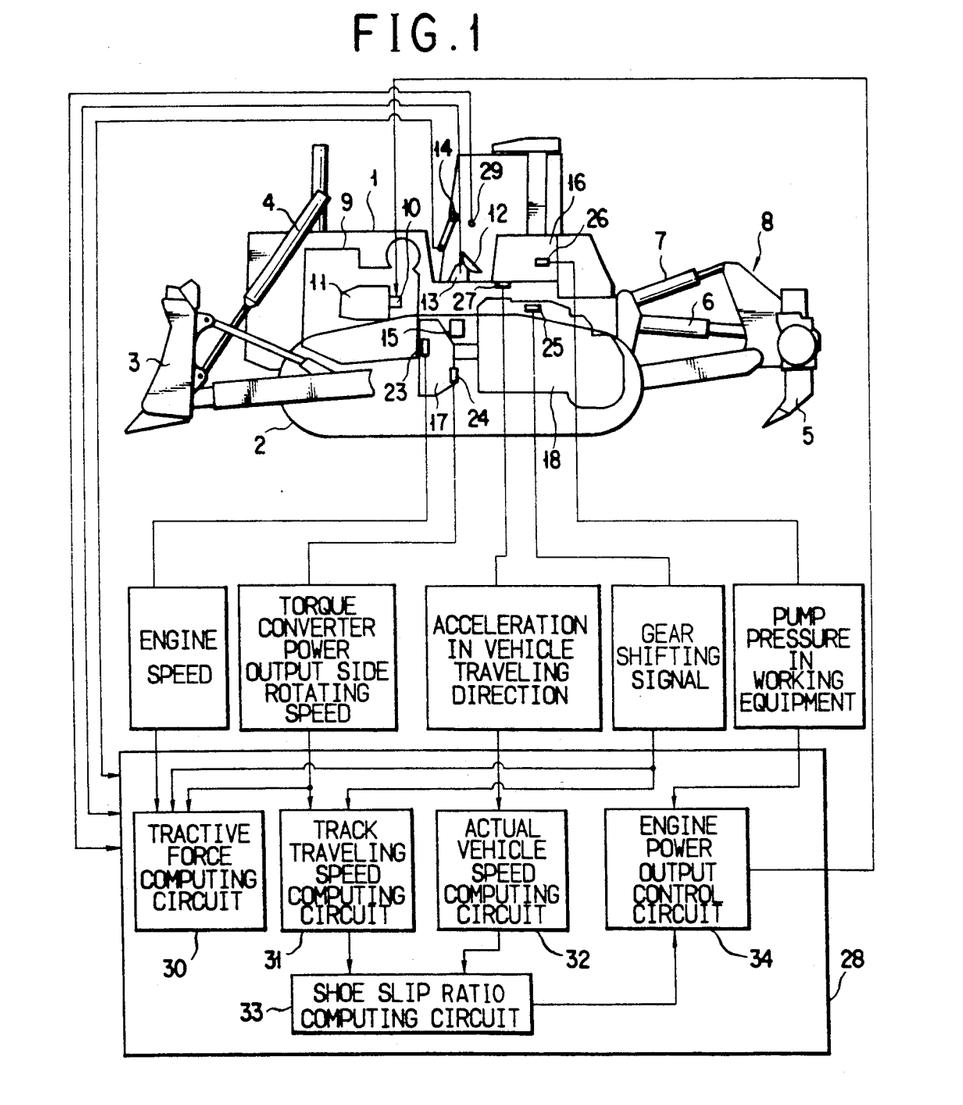
FIG. 1 diagrammatically illustrates a preferred embodiment of an apparatus of the present invention incorporated in a bulldozer which is an example of a crawler vehicle for carrying out a method of the present invention.

As shown in FIG. 1, a bulldozer or crawler vehicle has a vehicle body 1 on which: a pair of endless tracks 2, 2 are rotatably mounted while arranged side by side; a blade 3 is vertically movably mounted through a blade cylinder 4; and a ripper assembly 8 is mounted while constructed of a ripper shank 5 which is vertically moved by a lift cylinder 6 while tilted by a tilt cylinder 7.

Power output of an engine 9 of the crawler vehicle is controlled by an electrically controlled fuel injection pup 11 together with a manually operated throttle lever and a deceleration pedal 12. The electrically controlled fuel injection pump 11 is controlled by an electrically controlled governor 10. On the other hand, an operating or depressing stroke of the deceleration pedal 12 is measured by a sensor 13 which in turn issues a signal to have the power output of the engine of the crawler vehicle drop in proportion to the depressing stroke of the deceleration pedal 12.

Figure 2:
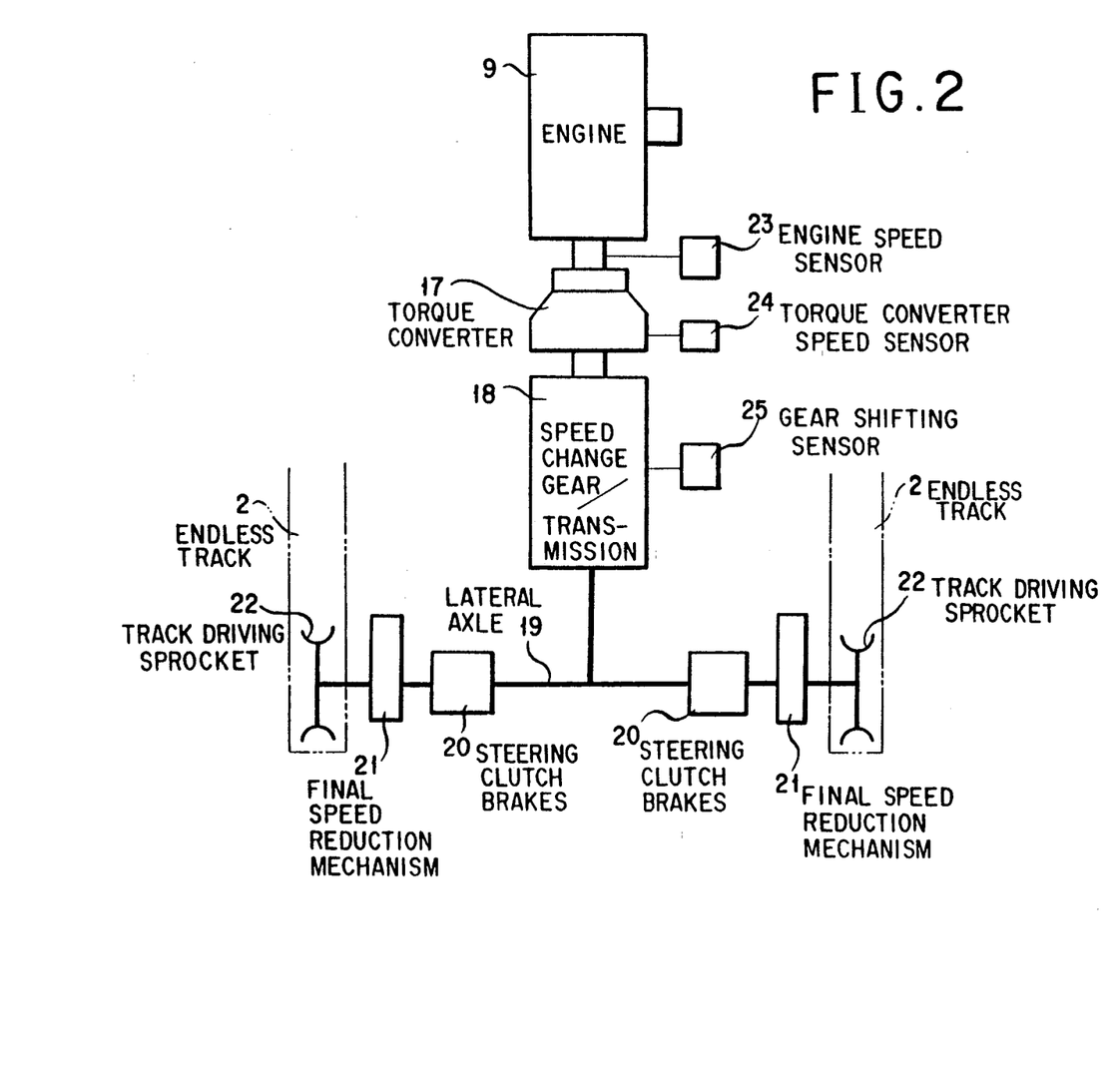
FIG. 2 is a schematic diagram of transmission of power of the crawler vehicle shown in FIG. 1.

Pressure oil issued from a pressure oil pump of a working equipment mounted on the crawler vehicle is supplied to the lift cylinder 6 and the tilt cylinder 7 through a control valve mounted in a working oil tank 16 so that these cylinder 6, 7 are actuated to have the ripper shank 5 penetrate the ground or move upward so as to control a ripping load. The pressure oil pump of the working equipment of the crawler vehicle is driven by the engine of the vehicle shown in FIG. 1. As shown in FIGS. 1 and 2, the power output side of the engine 9 of the crawler vehicle is connected with a pair of track-driving sprockets 22, 22 through: a torque converter 17; a speed change gear or transmission 18; a lateral axle 19; a right and a left steering clutch brake 20, 20; and a right and a left final speed-reduction mechanism 21, 21. An endless track 2 runs around each of the track-driving sprockets 22, 22 of the crawler vehicle. On the other hand, connected with a controller 28 mounted on the vehicle body 1 of the crawler vehicle are: an engine speed sensor 23 for detecting the engine speed of the engine 9; a torque converter power output side rotating speed sensor 23 for detecting a rotating speed of a power output side of the torque converter 17; a gear shifting sensor 25 for detecting a selected gear ratio of the transmission 18; a working equipment pump pressure sensor 26 for detecting a pump pressure in the working equipment of the crawler vehicle; and an acceleration sensor 27 for detecting an acceleration of the vehicle body 1 in its traveling direction. In FIG. 1, the reference numeral 29 denotes a track slip control on-off switch.

The controller 28 is provided with: a tractive force computing circuit 30; a track traveling speed computing circuit 31; an actual vehicle speed computing circuit 32; a shoe slip rate computing circuit 33; and an engine power output control circuit 34. The tractive force computing circuit 30 of the controller 28 computes a tractive force of the crawler vehicle on the basis of: an engine speed of the engine 9; a torque converter power output side rotating speed of the torque converter 17; and a selected gear ratio of the transmission 18. On the other hand, the track traveling speed computing circuit 31 of the controller 28 computes a track traveling speed of the endless tracks 2 of the crawler vehicle on the basis of: the torque converter power output side rotating speed of the torque converter 17; the selected gear ratio of the transmission 18; a total gear reduction ratio of the power transmission line interposed between the transmission 18 and the track-driving sprockets 22, 22 of the crawler vehicle; and a diameter of each of the sprockets 22, 22. The actual vehicle speed computing circuit 32 of the controller 28 computes an actual vehicle speed of the vehicle body 1 on the basis of the acceleration of the vehicle body 1 in its traveling direction. The show slip ratio computing circuit 33 of the controller 28 computes a shoe slip ratio of each of the endless tracks 2 on the basis of: the track traveling speed; and the actual vehicle speed having been computed. The engine power output control circuit 34 of the controller 28 issues a control signal to the electrically controlled governor 10 to set the engine power output of the engine 9 to a first preset engine power output mode or to a second present engine power output mode according to a pump pressure in the working equipment at a time when a shoe slip ratio of the crawler vehicle exceeds a preset value.

Hereinbelow, a plurality of embodiments of the method of the present invention for controlling the shoe slip of the crawler vehicle will be described in detail.

The method of the present invention comprises the steps of:

(1) Detecting an actual vehicle speed

An accelerometer is mounted on the vehicle body 1 of the crawler vehicle which may be employed as a detecting mechanism for accurately calculating an actual vehicle speed of the vehicle body 1. On the basis of the thus measured actual vehicle speed, a critical shoe slip ratio of the endless tracks 2, 2 of the crawler vehicle is computed, at which critical shoe slip ratio the endless tracks 2, 2 of the crawler vehicle begin to slip.

In this case, the accelerometer is mounted on the vehicle body 1 in the vicinity of a center of gravity of the crawler vehicle to measure an acceleration value of the crawler vehicle in a traveling direction. The thus measured acceleration value of the vehicle body 1 of the crawler vehicle is integrated with respect to time to determined an actual vehicle speed of the crawler vehicle. In computation of the actual vehicle speed of the crawler vehicle, the above acceleration value of the crawler vehicle is compensated for with respect to a tilting angle of the ground and vibration of the vehicle body 1 in operation in its traveling direction. Compensation for the acceleration value of the crawler vehicle may be conducted by employing: a tilt meter; a frequency filter; or a specific computation.

Figure 3:
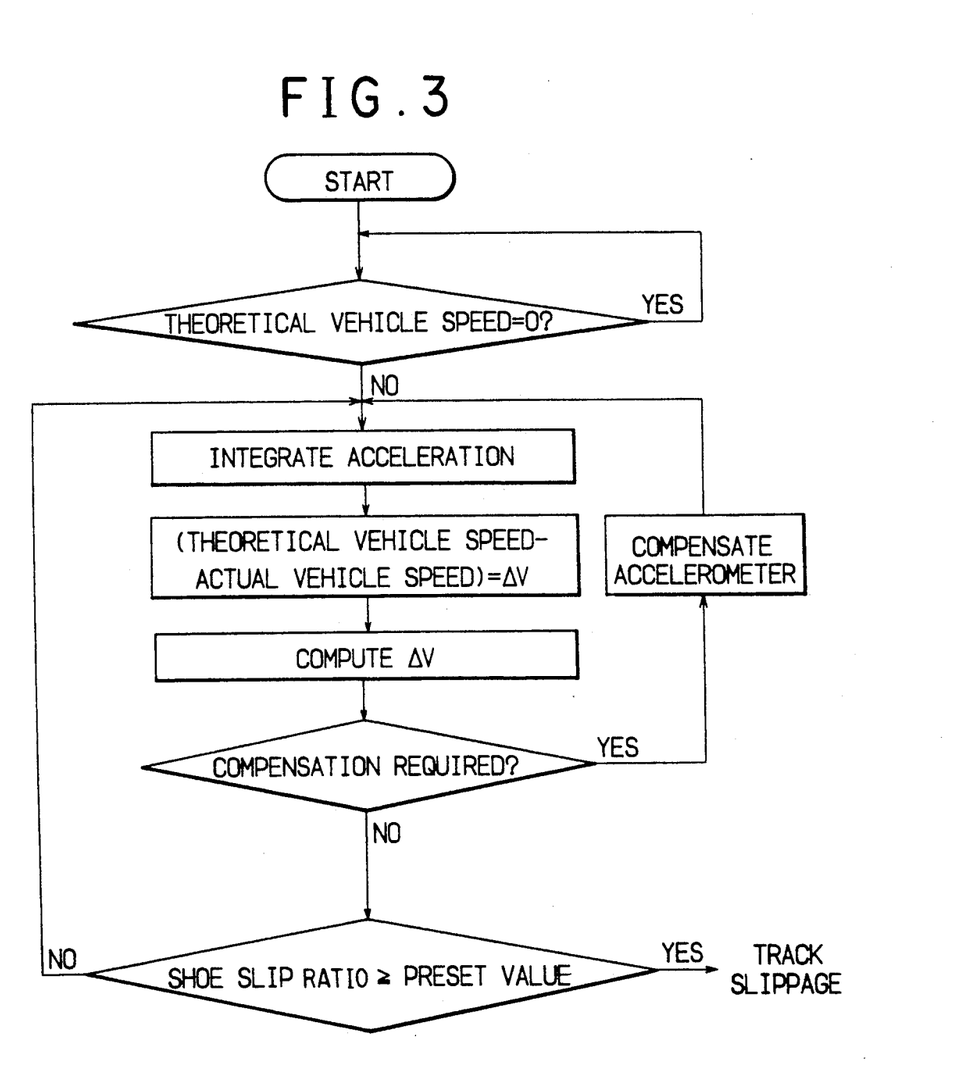
FIG. 3 is a flowchart illustrating the operation of an actual vehicle speed computing circuit of the apparatus of the present invention shown in FIG. 1.

FIG. 3 is a flowchart illustrating the operation of an actual vehicle speed computing circuit of the apparatus of the present invention shown in FIG. 1, in which circuit the accelerometer is employed.

When the actual vehicle speed of the crawler vehicle of FIG. 1 is determined, a shoe slip ratio of the endless tracks 2, 2 of the crawler vehicle is computed on the basis of the thus determined actual vehicle speed and a theoretical vehicle speed of the crawler vehicle as follows:

$$S = ((V_t - V_r)/V_t) \times 100(\%)$$

where:
the reference character S denotes a shoe slip ratio; $V_r$ an actual vehicle speed; and $V_t$ a theoretical vehicle speed.

(2) Cutting off an engine power output

Power output modes of the engine 9 are predetermined. When the shoe slip rate computed on the basis of the actual vehicle speed exceeds a preset value such as 30% or when a trigger signal such as a track slippage detecting trigger signal is issued, the engine power output mode of the engine 9 is set to a cut-off mode to reduce the engine power output of the engine to a predetermined value. Incidentally, there is a case where the cut-off mode is not required as a result of current operational conditions of: vehicle speeds including the actual vehicle speed and the theoretical vehicle speed of the crawler vehicle; the tractive force of the crawler vehicle; and the working equipment of the crawler vehicle.

Namely, according to the working conditions of the crawler vehicle, the engine power output of the vehicle can be changed to realize an instant cutting off of the engine power output of the engine 9 of the crawler vehicle.

(3) Recovering the engine power output

As a result of the cutting off of the engine power output and an adequate operation of the working equipment of the crawler vehicle, when the shoe slip ratio drops to a predetermined value such as 10% to stop the track slippage of the vehicle and when other conditions such as the theoretical vehicle speed and operation conditions of the working equipment of the vehicle are satisfied, the cutting off of the engine power output is canceled to return the operation mode of the engine 9 of the vehicle returns to a normal operation.

In this case, when the actual vehicle speed of the crawler vehicle is recovered by an amount of from 25 to 30%, the cutting off of the engine power output is also canceled. However, it is also possible to prevent the cutting off of the engine power output from being canceled or to change the timing of such a cancellation by providing specific requirements as to the vehicle speed and operational conditions of the working equipment of the crawler vehicle.

Now, the method of the present invention will be described in detail with respect to an actual specific operation of the crawler vehicle, (i.e., bulldozer).

Figure 4:
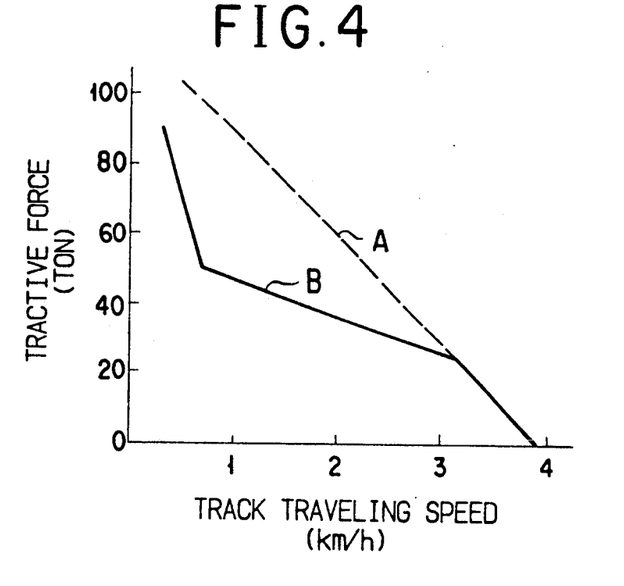

Among various works conducted by the bulldozer, ripping work requires the engine 9 of the bulldozer to operate under a basic power output mode which is different from a normal power output mode. For example, as shown in FIG. 4, with respect to the tractive force of the bulldozer, a base mode tractive force characteristic curve B is different from a tractive force characteristic curve A of a normal forward first speed drive of the bulldozer.

Figure 5:
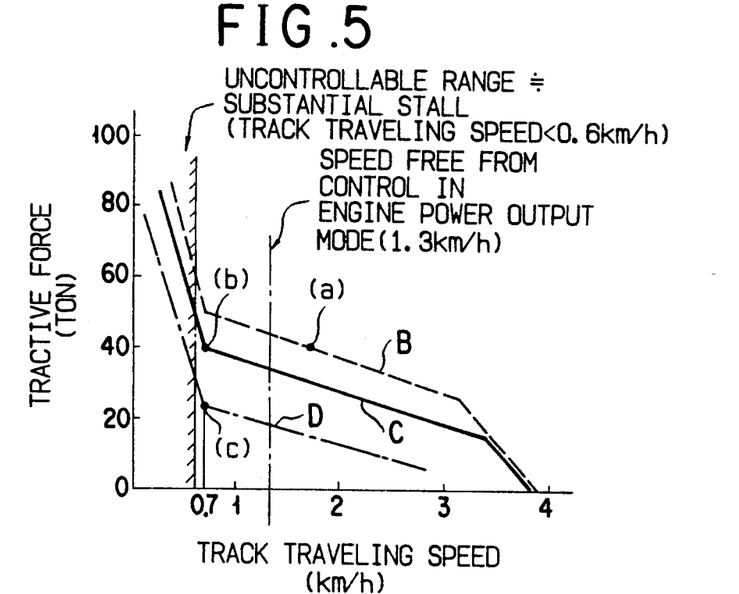

On the other hand, in the diagram shown in FIG. 5, the basic mode tractive force characteristic curve B is moved parallel to a vertical coordinate axis or tractive force axis of the diagram of FIG. 5 to form a first engine power output mode tractive force characteristic curve C and a second engine power output mode tractive force characteristic curve D. In operation, when the shoe slip rate of the bulldozer exceeds a predetermined value or rate and the pump pressure in the working equipment also exceeds a preset pressure, the engine 9 of the bulldozer is operated under the first engine power output mode so that the bulldozer produces a tractive force specified by the first engine power output mode tractive force characteristic curve C of the diagram shown in FIG. 5. On the other hand, under such conditions, when the pump pressure in the working equipment drops to a pressure loss than the preset pressure, the engine 9 of the bulldozer is operated under the second engine power output mode so that the bulldozer produces a tractive force specified by the second engine power output mode tractive force characteristic curve D of the diagram shown in FIG. 5.

Figure 6:
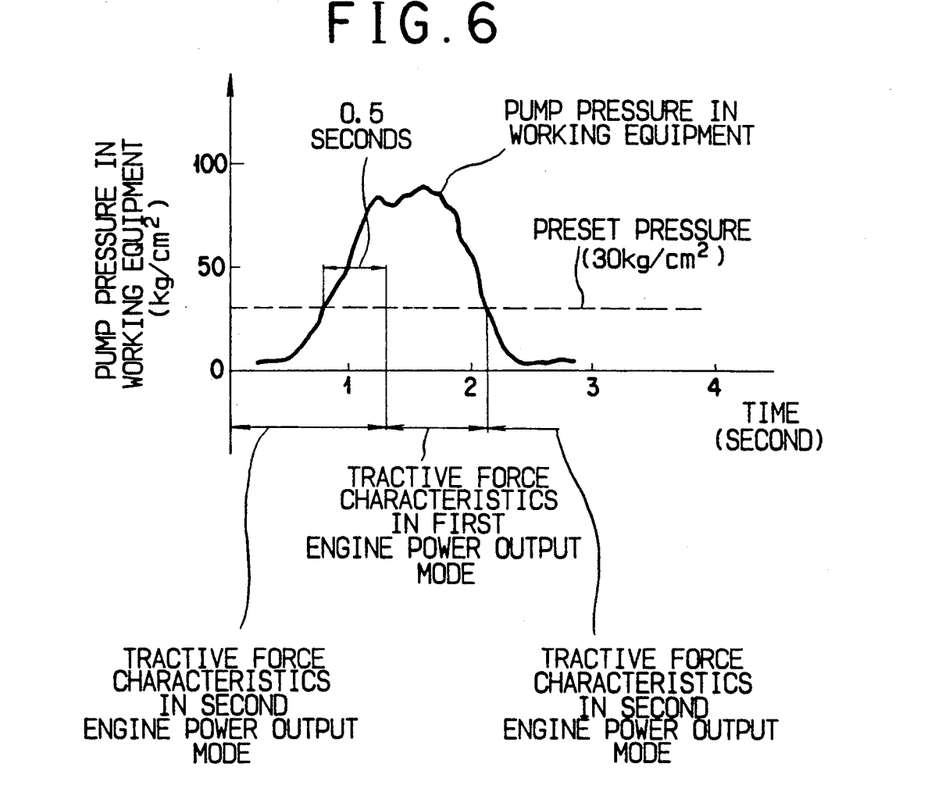
FIG. 6 is a diagram of the variation of pump pressure in a working equipment of the crawler vehicle of FIG. 1 as a time-base function, illustrating a time of shifting the engine power output mode of the crawler vehicle according to the method of the present invention.

Namely, in a condition in which the shoe slip rate exceeds the predetermined value: when the pump pressure in the working equipment exceeds the preset pressure (namely, when the control valve is operated to supply the pressure oil to both of the lift cylinder 6 and the tilt cylinder 7 to drive the ripper shank 5 of the bulldozer), the tractive force stays as it is, while the track traveling speed is reduced; and when the pump pressure in the working equipment is less than the preset pressure (namely, when the control valve is not operated so that the ripper shank 5 of the bulldozer is not driven), both the tractive force and the track traveling speed are reduced together. In this case, as shown in FIG. 6, when the pump pressure in the working equipment of the bulldozer stays at a pressure more or less than the preset pressure for 0.5 seconds, the second engine power output mode tractive force characteristic curve D or the first engine power output mode tractive force characteristic curve C of the diagram of FIG. 5 is selected in operation of the engine 9 of the bulldozer.

Figure 7:
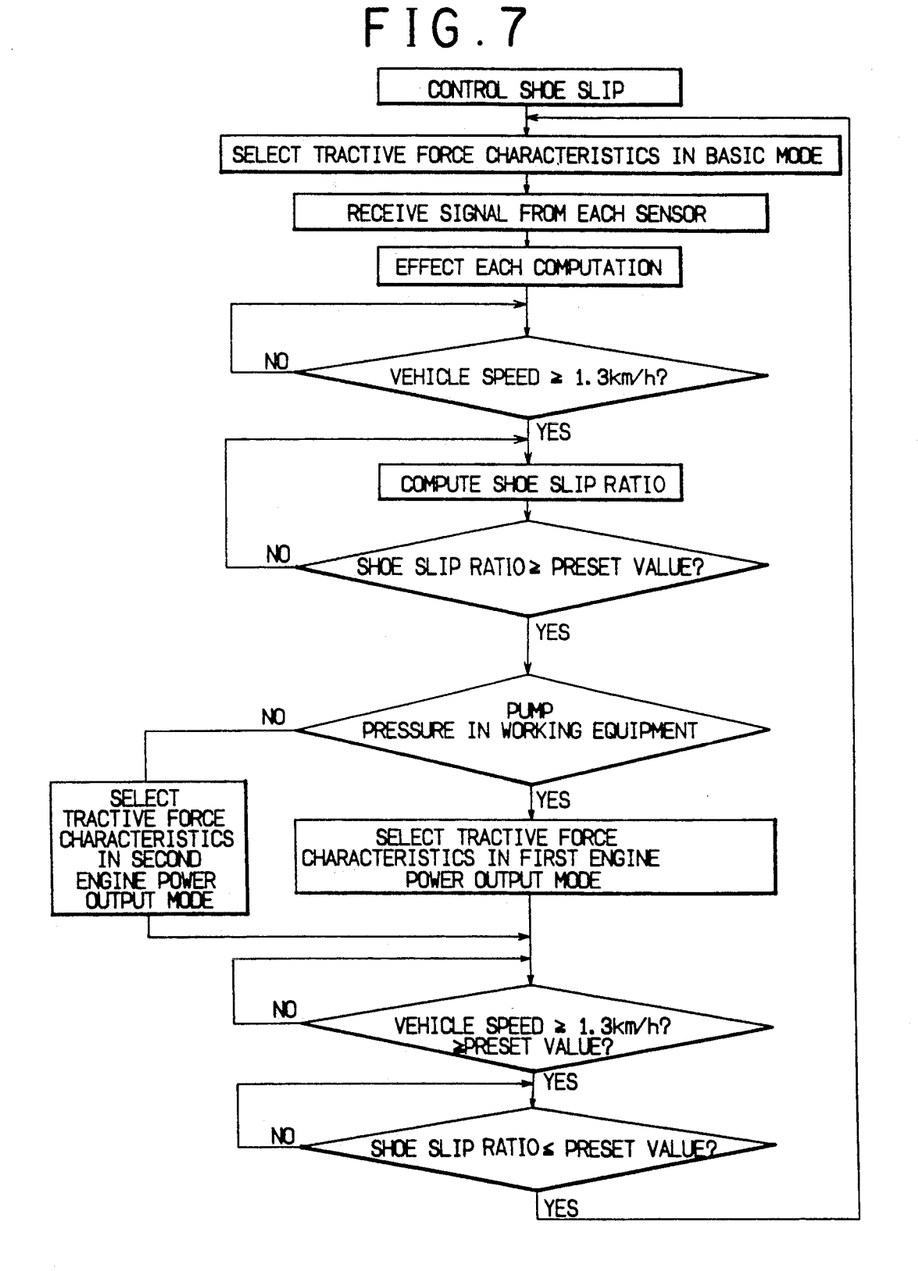
FIG. 7. is a flowchart illustrating organized procedure steps and data flow according to the method of the present invention.

FIG. 7. is the flowchart illustrating the abovementioned organized procedure steps and data flow according to the method of the present invention.

Now, computation of the shoe slip ratio of the bulldozer conducted on the basis of an acceleration detected by the acceleration sensor 27 for detecting an acceleration of the bulldozer in its traveling direction will be described in detail.

Figure 8:
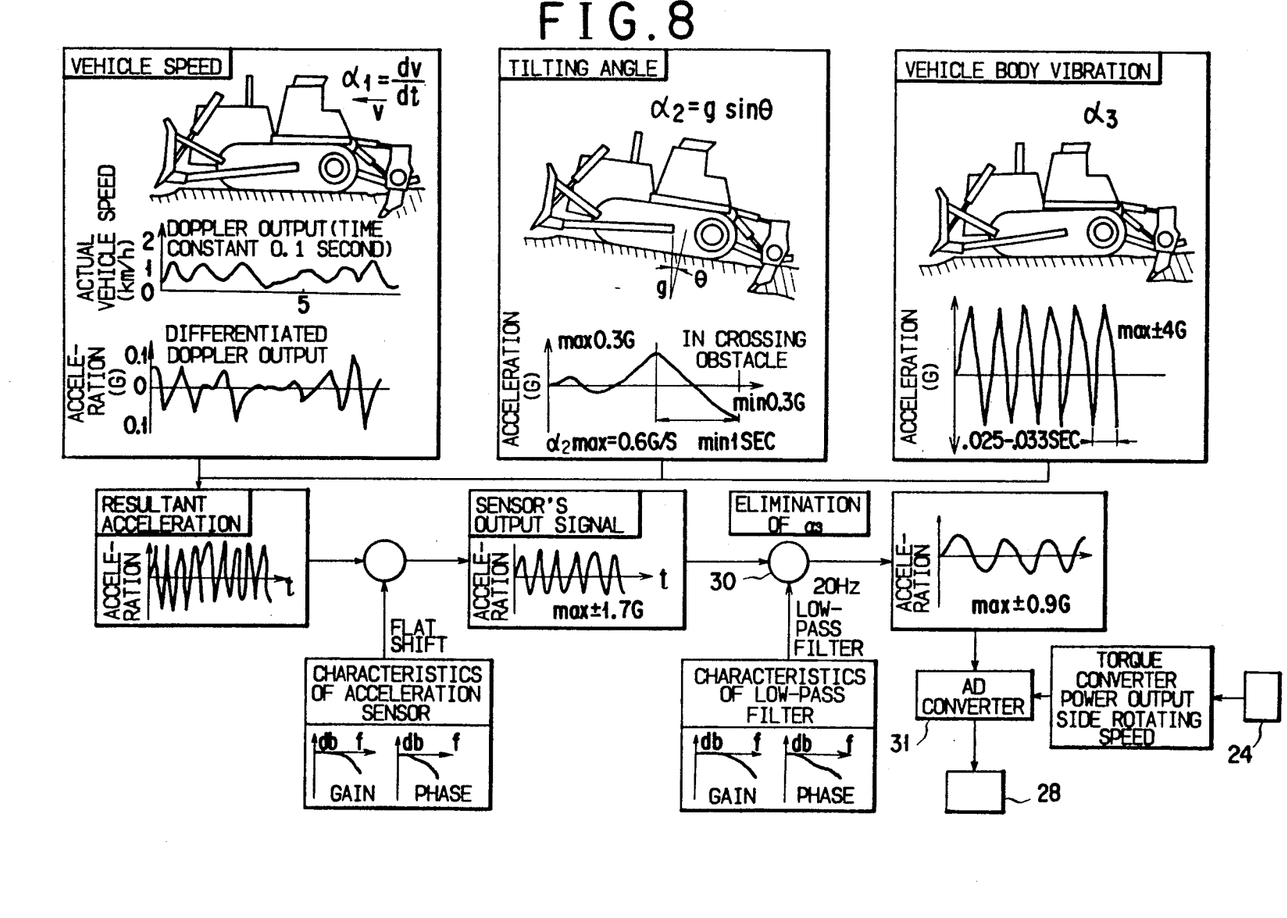
FIG. 8 is a schematic diagram illustrating the operation for detecting the acceleration of the crawler vehicle of FIG. 1 according to the method of the present invention.

As shown in FIG. 8, the acceleration detected by the acceleration sensor 27 is a resultant acceleration of: an acceleration $\alpha 1$: ($\alpha 1 = dv/dt$); an acceleration $\alpha 2$: ($\alpha 2 = g \cdot \sin \theta$) due to a tilting angle $\Gamma$ of the vehicle body 1 of the bulldozer; and an acceleration $\alpha 3$ due to vibration of the vehicle body 1 of the bulldozer. Consequently, the acceleration sensor 27 detects such a resultant acceleration that issue an detected-acceleration signal to a low-pass filter 30 through which the acceleration α3 in the signal is removed. After that, the low-pass filter 30 issues a signal to an AD converter 31 in which both of the signal having been issued from the low-pass filter 30 and a signal based on the torque converter power output side rotating speed are converted into digital signals which are in turn issued to the controller 28 from the AD converter 31.

In the controller 28: the acceleration is integrated to determine a computed vehicle speed $Vc = \int (\alpha 1 - g \cdot \sin \theta) dt$; and the track traveling speed Vt is also computed as described above.

On the other hand, the controller 28 computes a slip acceleration s of the bulldozer within 0.05 seconds as follows:

$$\alpha s = (Vc = Vt)/dt$$

Figure 9A:
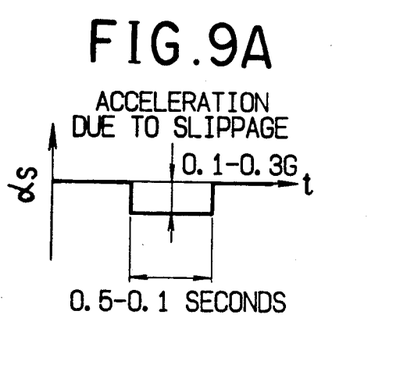
FIGS. 9A to 9D are diagrams illustrating the acceleration of the crawler vehicle of FIG. 1 due to slippage of the vehicle.
Figure 9B:
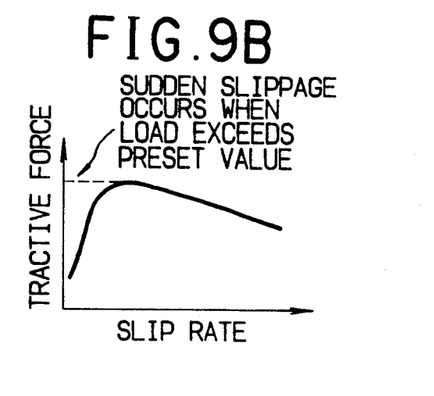

As for the characteristics of the slip acceleration, FIGS. 9A and 9B are referred to. As shown in FIG. 9B, when the load exceeds a preset value, a sudden slippage of the endless tracks 2, 2 of the bulldozer occurs to increase the shoe slip ratio. As a result, as shown in FIG. 9A, a slip acceleration assuming a pulse-like form having a pulse width of from 0.5 to 1.0 seconds and a pulse magnitude of from 0.1 to 0.3 G is produced.

Figure 9C:
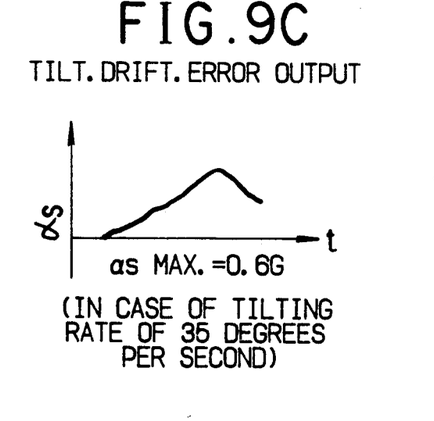
Figure 9D:
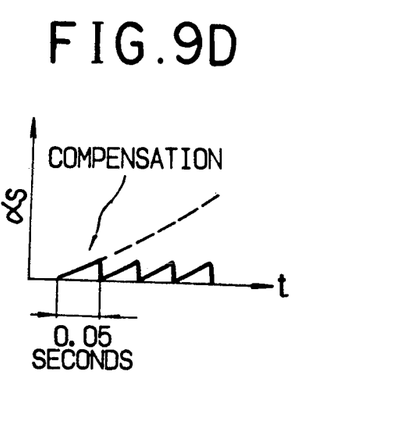
Figure 101:
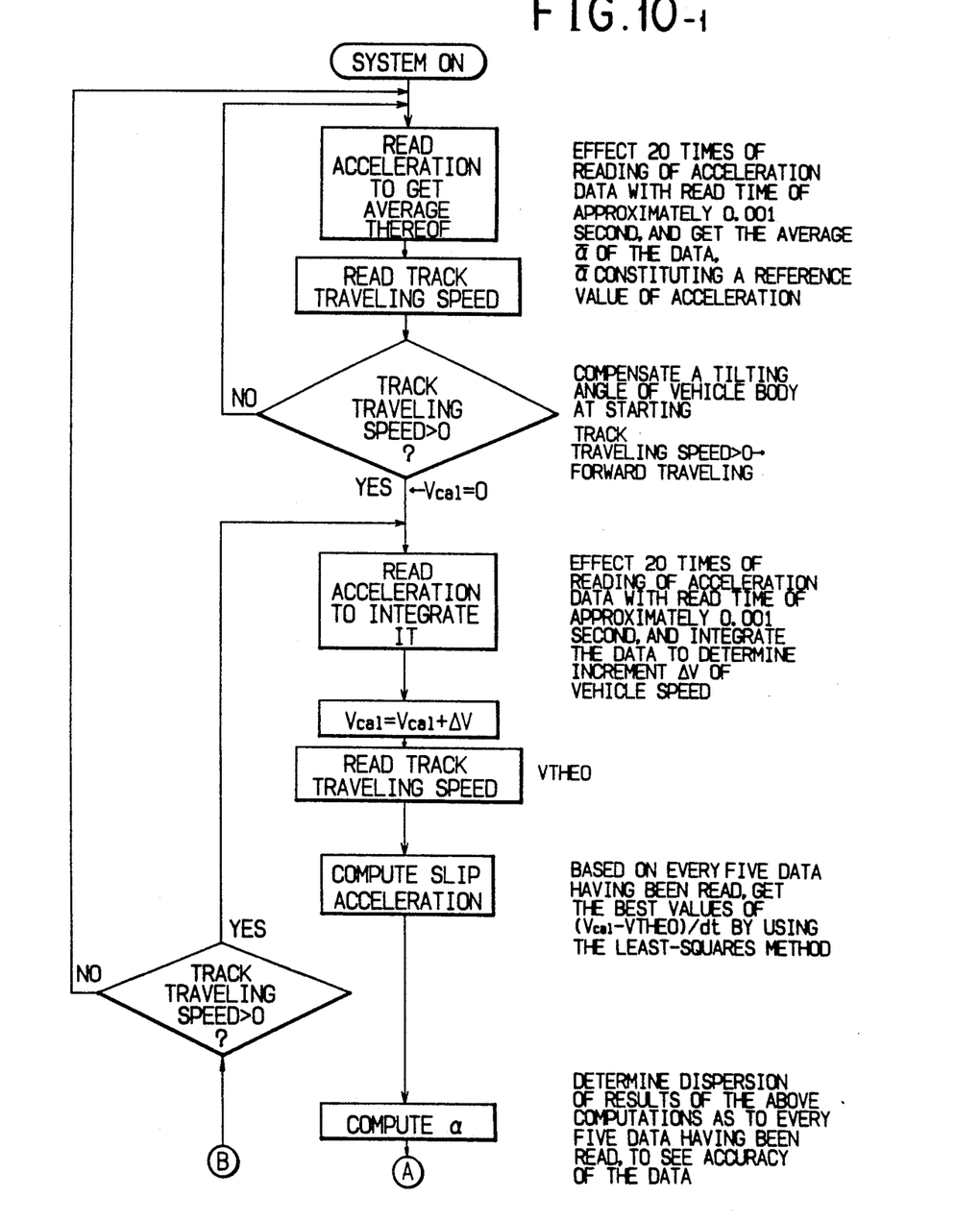
Figure 102:
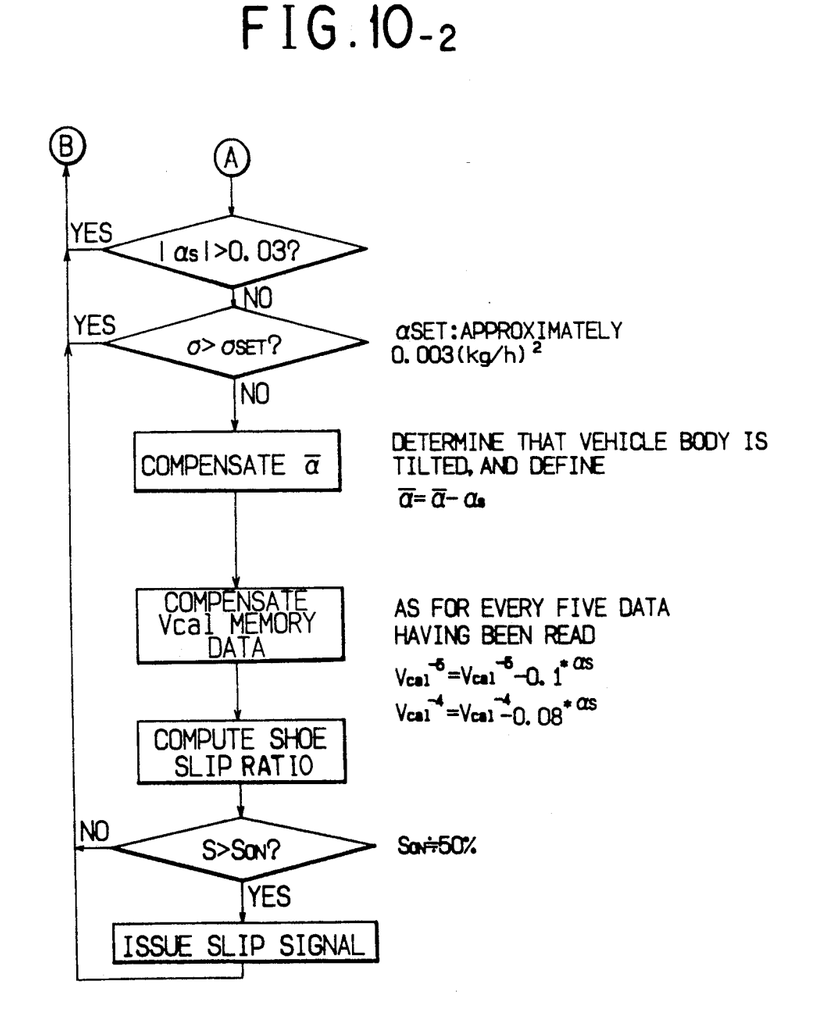

On the other hand, where the bulldozer tilts at a rate of 35 degrees per second, an incremental rate of the slip acceleration is 0.6 G/second, (i.e., 0.03 G/0.05 seconds). As a result, as shown in FIGS. 9C and 9D, where the slip acceleration is computed within 0.05 seconds, so is clear from a dotted curve in the diagram shown in FIG. 9D, it is possible to determine as to whether the slip acceleration is caused by a slip-page of the bulldozer or by a tilting angle of the bulldozer.

Consequently, as for the slip acceleration αs

In a condition where $|\alpha s|$ is larger than 0.03 G, compensation of the slip acceleration is not required; and In a condition where $|\alpha s|$ is smaller than 0.03 G, compensation of the slip acceleration is conducted as follows: first, the computed vehicle speed Vcal is compensated according to the following equation:

$$Vcal = Vcal - 0.05 \, \alpha s$$

and then an acceleration zero point α is compensated according to the following equation:

$$\bar{a} = \bar{a} - \bar{a}s$$

so that the acceleration α2: ($\alpha 2 = g \cdot \sin \theta$) due to the tilting angle θ of the vehicle body 1 of the bulldozer is prevented from being accumulated, whereby the slip acceleration assumes a sawtooth wave form as shown in the diagram of FIG. 9D.

As described above, after the computed vehicle speed is compensated on the basis of the predetermined value of the slip acceleration αs, the shoe slip rate S is computed in the shoe slip rate computing circuit of the controller according to the following equation: The shoe slip ration $S = ((Vt - Vc)/Vt) \times 100(\%)$, where Vt is the theoretical vehicle speed and Vc is the calculated vehicle speed.

Since the shoe slip ratio S is computed as described above, it is possible to accurately compute the shoe slip rate S of the bulldozer even if the vehicle body 1 of the bulldozer vibrates and tilts during working operations thereof.

In addition to the above embodiment, the method of the present invention may be carried out through the following means:

Namely, in the step of detecting the actual vehicle speed of the method of the present invention, it is possible to directly detect the actual vehicle speed of the bulldozer by the sue of a space filter and a Doppler sensor. In addition, it is also possible for the method of the present invention to employ: ratios of rotating speeds of a driving member of the torque converter in the power line of the bulldozer to rotating speeds of a driven member of the same torque converter; manual switching operations conducted by the operator of the bulldozer; and a dial setting technique.

As for the steps of cutting off the engine power output of the bulldozer, the step is accomplished by controlling the electrically controlled governor through an analog control technique based on the shoe slip rate of the bulldozer.

As for the step of recovering the engine power output of the bulldozer, the step is accomplished by: having the operator of the bulldozer depress a recovering or return button; and determining an engine power output recovering point with reference to the vehicle speed and the tractive force of the bulldozer, at which point the cutting off of the engine power output is canceled to enable the engine of the bulldozer to return to its normal operating condition.

As is clear from the above description, according to the method and apparatus of the present invention for controlling the shoe slip of the crawler vehicle, it is possible to improve the crawler vehicle in its fuel consumption rate and to decrease the shoe wear of the crawler vehicle, so that the crawler vehicle is improved in its durability.

Furthermore, the method and apparatus of the present invention enables the operator of the crawler vehicle to drastically reduce the number of times his manual operation of the deceleration pedal of the crawler vehicle is required during working operations of the vehicle, thereby making operation of the crawler vehicle easy. Consequently, it is believed that the present invention can be widely used in industry.

We claim:

1. A method for controlling shoe slip of a crawler vehicle having endless tracks and an engine initially operating at a predetermined specific engine power output mode, said method comprising the steps of:

detecting a vehicle acceleration of said crawler vehicle at a time when the shoe slip of said crawler vehicle exceeds a shoe slip preset limit, by the use of a vehicle acceleration detecting means mounted on said crawler vehicle;

determining an actual vehicle speed based on said detected vehicle acceleration by integrating the detected vehicle acceleration after removal of a frequency wave component due to vibrations of the vehicle body and subsequently compensating for an influence of gravity due to an inclination of the vehicle;

determining a track travelling speed of the endless tracks of the crawler vehicle;

computing the shoe slip ratio of said crawler vehicle on the basis of said determined actual vehicle speed and the track travelling speed;

cutting of an engine power output of the engine of said crawler vehicle by shifting operation mode of the engine from the predetermined specific engine power output mode to a cut-off mode when at least one of the computed shoe slip ratio of said crawler vehicle exceeds a preset first shoe slip ratio value and a track slippage detecting trigger signal is issued; and returning the operation mode of the engine back to the predetermined specific engine power output mode when the shoe slip ratio of said crawler vehicle drops to a predetermined second shoe slip ratio value after said engine power output is cut off.

2. A method according to claim 1, wherein the frequency wave component due to vibrations of the vehicle body is removed by a low-pass filter.

3. A method according to claim 1, wherein the endless tracks of the crawler vehicle are two endless tracks, one on each side of the crawler vehicle.

4. An apparatus for controlling shoe slip of a crawler vehicle having an engine initially operating at a predetermined specific engine power output mode and endless tracks, said apparatus comprising:

an acceleration detecting means for detecting acceleration of said crawler vehicle in a traveling direction;

a track traveling speed computing means for computing a track traveling speed of the endless tracks of said crawler vehicle;

an actual vehicle speed computing means connected to said acceleration detecting means for computing an actual vehicle speed of said crawler vehicle on the basis of the detected rate of acceleration, said actual vehicle speed computing means comprising an acceleration integration means for integrating the detected vehicle acceleration after removal of a frequency wave component due to vibrations of the vehicle body, and a correction means for subsequently compensating for an influence of gravity due to an inclination of the vehicle;

a shoe slip ratio computing means connected to said actual vehicle speed computing means and said track traveling speed computing means for computing a shoe slip ratio of said crawler vehicle on the basis of the actual vehicle speed and the track traveling speed of said crawler vehicle; and an engine power output control means connected to said shoe slip ratio computing means for selecting an engine power output node for the engine of said crawler vehicle according to the computed shoe slip ratio.

5. An apparatus according to claim 4, wherein said engine power output control means comprises:

means for cutting off an engine power output of the engine by shifting operation mode of the engine from the predetermined specific engine power output mode to a cut off mode when the shoe slip ratio exceeds a preset first shoe slip ratio value; and means for returning the operation mode of the engine back to the specific predetermined engine power output mode when the shoe slip ratio of said crawler vehicle drops to a predetermined second shoe slip ratio value after said engine power is cut off.

6. An apparatus according to claim 4, wherein a low-pass filter is provided for removal of the frequency wave component due to vibration of the vehicle body.

7. An apparatus according to claim 4, wherein the endless tracks of the crawler vehicle are two endless tracks, one on each side of the crawler vehicle.

* * * * *

UNITED STATES PATENT AND TRADEMARK OFFICE
CERTIFICATE OF CORRECTION

PATENT NO.  : 5,287,280
DATED       : February 15, 1994
INVENTOR(S) : Yamamoto, et. al.

It is certified that error appears in the above-indentified patent and that said Letters Patent is hereby corrected as shown below:

Title page, item [30], line 2, should read-- "Sep. 17, 1987 [JP]
Japan..............62-231116"--.

Signed and Sealed this

Twentieth Day of September, 1994

Attest:

BRUCE LEHMAN

Attesting Officer　　　　Commissioner of Patents and Trademarks